United States Patent
Patel et al.

(10) Patent No.: US 10,391,864 B2
(45) Date of Patent: Aug. 27, 2019

(54) SYSTEM TO BALANCE HIGH VOLTAGE BATTERY FOR VEHICLE

(71) Applicant: Toyota Motor Engineering & Manufacturing North America, Inc., Erlanger, KY (US)

(72) Inventors: Tapan V. Patel, Lakewood, CA (US); Justin J. Chow, Los Angeles, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 79 days.

(21) Appl. No.: 15/427,913

(22) Filed: Feb. 8, 2017

(65) Prior Publication Data

US 2018/0222345 A1 Aug. 9, 2018

(51) Int. Cl.
*B60L 3/00* (2019.01)
*B60L 58/12* (2019.01)
*B60L 58/22* (2019.01)
*B60L 58/20* (2019.01)

(52) U.S. Cl.
CPC .............. *B60L 3/0046* (2013.01); *B60L 58/12* (2019.02); *B60L 58/20* (2019.02); *B60L 58/22* (2019.02); *B60L 2240/547* (2013.01); *Y02T 10/7005* (2013.01)

(58) Field of Classification Search
CPC ........ H01M 2010/4271; B60L 11/1814; B60L 11/1861; B60L 11/1864; B60L 11/1868; B60L 11/1851; B60L 2240/547; B60L 2240/549; B60L 3/0046; H02J 7/0068; H02J 7/0024
See application file for complete search history.

(56) References Cited

U.S. PATENT DOCUMENTS

| | | | |
|---|---|---|---|
| 6,272,634 B1 | 8/2001 | Tewfik et al. | |
| 6,759,832 B2* | 7/2004 | Minamiura | B60L 3/0023 320/150 |
| 7,253,584 B2* | 8/2007 | Souther | B60L 11/1851 320/104 |
| 7,453,232 B2* | 11/2008 | Furukawa | H02J 7/0021 320/104 |

(Continued)

FOREIGN PATENT DOCUMENTS

| | | |
|---|---|---|
| KR | 10-0727002 | 6/2007 |
| KR | 10-1241489 | 3/2013 |

*Primary Examiner* — Helen Rossoshek

(74) *Attorney, Agent, or Firm* — Snell & Wilmer LLP

(57) ABSTRACT

A system includes a battery pack designed to store electrical energy at a rated voltage and having a first and second battery module, each having a plurality of battery cells, and at least one switch selectively coupled to the battery modules. The system further includes an on-board charger that receives electrical power. The system further includes an ECU that determines a current voltage of the battery modules. The ECU also controls the at least one switch to transfer the electrical power to a combination of the battery modules until the current voltage of the first battery module or the second battery module reaches the rated voltage. The ECU also controls the at least one switch to transfer the electrical power to the first battery module when the current voltage of the first battery module is less than the current voltage of the second battery module.

18 Claims, 6 Drawing Sheets

(56) References Cited

U.S. PATENT DOCUMENTS

| | | | | |
|---|---|---|---|---|
| 7,631,712 B2* | 12/2009 | Watanabe | | B60K 1/04 |
| | | | | 180/65.1 |
| 7,900,727 B2* | 3/2011 | Shinmura | | B60K 1/04 |
| | | | | 180/68.1 |
| 8,047,316 B2* | 11/2011 | Takami | | B60K 6/46 |
| | | | | 180/65.29 |
| 8,058,842 B2 | 11/2011 | Kai et al. | | |
| 8,981,727 B2 | 3/2015 | Kusch et al. | | |
| 9,184,605 B2 | 11/2015 | Chang et al. | | |
| 9,190,861 B2* | 11/2015 | Kim | | H02J 7/007 |
| 9,231,280 B2 | 1/2016 | Komatsu et al. | | |
| 9,236,749 B2 | 1/2016 | Gibbs et al. | | |
| 9,278,622 B2 | 3/2016 | Tagaya et al. | | |
| 9,318,910 B2 | 4/2016 | Kim | | |
| 9,321,358 B2 | 4/2016 | Robins et al. | | |
| 2003/0066695 A1* | 4/2003 | Beckerman | | B60T 1/10 |
| | | | | 180/65.29 |
| 2009/0130538 A1* | 5/2009 | Kaita | | G01R 31/3662 |
| | | | | 429/50 |
| 2012/0271758 A1* | 10/2012 | Jammer | | B60L 11/1816 |
| | | | | 705/39 |
| 2013/0175976 A1 | 7/2013 | Rana | | |
| 2013/0249488 A1* | 9/2013 | Ju | | B60L 11/1859 |
| | | | | 320/112 |
| 2013/0249493 A1* | 9/2013 | Kim | | B60L 3/003 |
| | | | | 320/134 |
| 2013/0314094 A1* | 11/2013 | Farmer | | G01N 25/20 |
| | | | | 324/430 |
| 2014/0354212 A1 | 12/2014 | Sugeno et al. | | |
| 2015/0236538 A1* | 8/2015 | Cai | | H01M 10/00 |
| | | | | 320/112 |
| 2015/0263395 A1* | 9/2015 | Okabe | | H01M 2/1077 |
| | | | | 429/90 |
| 2016/0059712 A1 | 3/2016 | Jang | | |
| 2016/0109500 A1* | 4/2016 | Chang | | G01R 31/025 |
| | | | | 324/509 |
| 2016/0241028 A1 | 8/2016 | Long | | |
| 2016/0258993 A1* | 9/2016 | Bagchi | | G01R 31/025 |
| 2017/0358831 A1* | 12/2017 | Milroy | | H01M 10/658 |
| 2018/0001744 A1* | 1/2018 | Vehr | | B60H 1/3205 |
| 2018/0043789 A1* | 2/2018 | Goetz | | H02J 7/0024 |

\* cited by examiner

SYSTEM TO BALANCE HIGH VOLTAGE BATTERY FOR VEHICLE

BACKGROUND

Field

The present disclosure relates to systems and methods for controlling charging of a vehicle battery and, more particularly, to systems and methods for charging individual battery modules of a battery pack that may charge slower than other battery modules.

Description of the Related Art

Electric and hybrid vehicles are becoming more popular as time goes on. Recently, plug-in hybrid vehicles have also increased in popularity. Electric and plug-in hybrid vehicles include battery packs that are charged via an external power supply. Although technology is advancing in the area of rechargeable battery packs for use with electric and hybrid vehicles, current battery packs have some associated disadvantages. In particular, the charge and discharge rates of current battery packs may change over time. For example, a battery pack for use in an electric vehicle may include four battery modules. Initially each of the battery modules may charge and discharge at the same rate. However, after years of use, each of the battery modules may charge and discharge at different rates.

Conventional vehicle battery chargers will typically charge a battery pack until one of the battery modules reaches a rated voltage of the battery module. The rated voltage may correspond to a voltage at which the battery module is rated for use, which also may correspond to a maximum desirable voltage of the battery module. However, if each of the battery modules charges at a different rate then the battery pack may never again receive a full charge due to the charging being halted when the first battery module reaches the rated voltage. Accordingly, a range of the vehicle may become reduced over time due to the lack of full charging of the battery pack.

Accordingly, there is a need in the art for systems and methods for dynamically charging battery modules of a vehicle battery pack.

SUMMARY

Described herein is a vehicle charging system. The vehicle charging system includes a battery pack that has a first battery module and a second battery module each designed to store electrical energy at a rated voltage. The vehicle charging system further includes at least one switch designed to be selectively coupled to the first battery module and the second battery module. The vehicle charging system further includes an on-board charger designed to receive electrical power from an external power source. The vehicle charging system further includes an electronic control unit (ECU) coupled to the battery pack and the at least one switch. The ECU is designed to determine a first current voltage of the first battery module and a second current voltage of the second battery module. The ECU is further designed to control the at least one switch to transfer the electrical power from the on-board charger to a combination of the first battery module and the second battery module until at least one of the first current voltage of the first battery module or the second current voltage of the second battery module reaches the rated voltage. The ECU is further designed to control the at least one switch to transfer the electrical power from the on-board charger to the first battery module when the first current voltage of the first battery module is less than the second current voltage of the second battery module.

Also described is a vehicle charging system. The vehicle charging system includes a battery pack including a first battery module and a second battery module, each having a plurality of battery cells. The battery pack is designed to store electrical energy at a rated voltage. The system further includes a module switch designed to be selectively coupled to the first battery module and the second battery module. The system further includes a battery management system (BMS) coupled to the battery pack and designed to determine a first current voltage of the first battery module and a second current voltage of the second battery module. The system further includes an on-board charger designed to receive electrical power from an electric vehicle supply equipment (EVSE). The system further includes a pack switch coupled to the on-board charger and the battery pack and designed to selectively transfer the electrical power from the on-board charger to the module switch and to a combination of the first battery module and the second battery module. The system further includes an electronic control unit (ECU) coupled to the module switch, the BMS, and the pack switch. The ECU is designed to control the pack switch to transfer the electrical power from the on-board charger to the combination of the first battery module and the second battery module when the first current voltage of the first battery module and the second current voltage of the second battery module are both less than the rated voltage. The ECU is further designed to control the pack switch to transfer the electrical power from the on-board charger to the module switch and control the module switch to transfer the electrical power to the first battery module when the first current voltage of the first battery module is less than the second current voltage of the second battery module. The ECU is further designed to control the pack switch to transfer the electrical power from the on-board charger to the module switch and control the module switch to transfer the electrical power to the second battery module when the first current voltage of the first battery module is greater than the second current voltage of the second battery module.

Also described is a method for charging a battery pack for use in a vehicle. The method includes determining, by a battery management system (BMS), a first current voltage of a first battery module and a second current voltage of a second battery module of the battery pack. The method further includes receiving, by an on-board charger, electrical power from an electric vehicle supply equipment (EVSE). The method further includes controlling, by an electronic control unit (ECU), a pack switch to transfer the electrical power from the on-board charger to a combination of the first battery module and the second battery module when the first current voltage of the first battery module and the second current voltage of the second battery module are both less than a rated voltage. The method further includes controlling, by the ECU, the pack switch to transfer the electrical power from the on-board charger to a module switch and controlling, by the ECU, the module switch to transfer the electrical power to the first battery module when the first current voltage of the first battery module is less than the second current voltage of the second battery module. The method further includes controlling, by the ECU, the pack switch to transfer the electrical power from the on-board charger to the module switch and controlling, by the ECU, the module switch to transfer the electrical power to the second battery module when the first current voltage of the first battery module is greater than the second current voltage of the second battery module.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

The present disclosure is directed to systems and methods for controlling charging of a vehicle battery pack. An exemplary system includes a chargeable battery pack having multiple battery modules, an on-board charger, an electronic control unit (ECU), and one or more switch. The ECU may determine a voltage or power level of each of the battery modules of the battery pack while the battery pack is charging. The one or more switch may be positioned between the on-board charger and the battery pack. When the on-board charger is connected to an electric vehicle supply equipment (EVSE), the ECU may control the one or more switch to transfer the electronic power to a combination of all battery modules of the battery pack. When one or more battery module is fully charged, the ECU may control the one or more switch to transfer the electronic power to another one or more battery module having low power to.

Use of the system provides the benefit of a more robust charging of the battery pack. Instead of stopping the transfer of electrical power when one battery module is fully charged, as conventionally done, the system advantageously provides additional electrical power to any battery module that is not yet fully charged. This additional electrical power provides the benefit of increasing a total charge of the battery pack, resulting in the vehicle having a longer driving range. The system may further detect power leakage from any of the battery modules and may advantageously inform a driver of such leakage so that the driver may take the vehicle in for servicing. The system may also detect whether one or more battery module is faulty and prevents electrical power from being transferred to the faulty battery, beneficially reducing the likelihood of power being wasted.

Figure 1:
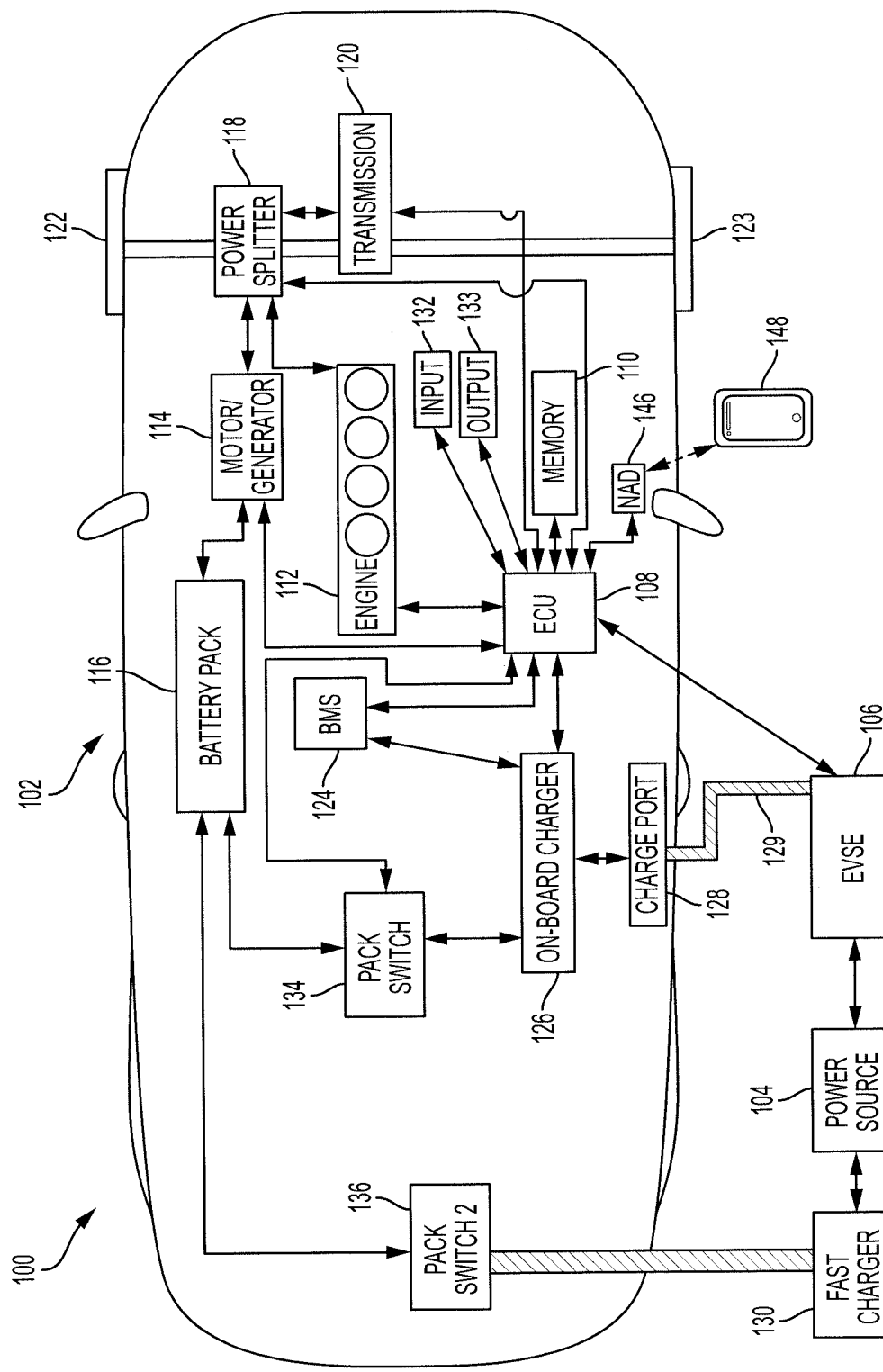
FIG. 1 is a block diagram of a plug-in hybrid vehicle designed to control transfer of electricity from an electric vehicle supply equipment (EVSE) to various battery modules of the plug-in hybrid vehicle according to an embodiment of the present invention.

Turning to FIG. 1, a vehicle charging system is designed to control electric charging of a vehicle battery. The vehicle charging system 100 may include components from one or more of a vehicle 102, a power source 104, an EVSE 106, or a fast charger 130. The power source 104 may include any power source capable of providing electricity, such as a wall outlet or industrial power supply.

The EVSE 106 is coupled to the power source 104 and transfers electrical power from the power source 104 to the vehicle 102 for charging a battery pack 116 of the vehicle 102. Likewise, the fast charger 130 is coupled to the power source 104 and transfers electrical power from the power source 104 to the vehicle 102 for charging the battery pack 116 of the vehicle 102. In some embodiments, the fast charger 130 may provide electrical power to the battery pack 116 at a faster rate than the EVSE 106. In some embodiments, the fast charger 130 may also be referred to as an EVSE.

The vehicle 102 may include an ECU 108, a memory 110, an engine 112, a motor-generator 114, the battery pack 116, a power splitter 118, and a transmission 120. Although the vehicle 102 is shown to be a plug-in hybrid vehicle, one skilled in the art will realize that the present disclosure applies to any other vehicle configuration that includes a battery that receives charge from an external EVSE without departing from the scope of the present invention.

The ECU 108 can include one or more processors or controllers, which may be specifically designed for automotive systems. The functions of the ECU 108 can be implemented in a single ECU or in multiple ECUs. The ECU 108 may receive data from components of the vehicle 102, may make determinations based on the received data, and may control the operation of components based on the determinations.

The memory 110 may include any non-transitory memory known in the art. In that regard, the memory 110 may store machine-readable instructions usable by the ECU 108 and may store any other data as requested by the ECU 108.

The engine 112 converts fuel into mechanical power. In that regard, the engine 112 may be a gasoline engine, a diesel engine, a fuel cell engine or the like.

The battery pack 116 stores electrical energy. The motor-generator 114 converts the electrical energy stored in the battery pack 116 to mechanical power. The motor-generator 114 may also convert received mechanical power into electrical energy, which may then be stored in the battery pack 116.

The power splitter 118 may be coupled to the engine 112 and the motor-generator 114. The power splitter 118 may transfer mechanical power received from the motor-generator 114 and/or the engine 112 to the transmission 120. In some embodiments, the power splitter 118 may control how much mechanical power is transferred to the transmission 120 from each of the motor-generator 114 and the engine 112. For example, the ECU 108 may control the power splitter 118 to achieve a desired power transfer from each of the motor-generator 114 and the engine 112 to the transmission 120.

The transmission 120 may be coupled to two or more wheels 122, 123. In that regard, the transmission 120 may transfer power received from the power splitter 118 to the wheels 122, 123.

A battery management system (BMS) 124 may be coupled to the battery pack 116. The BMS 124 may measure, using battery sensors (not shown), parameters used to determine a SOC, a current temperature, and a current voltage of the battery pack 116. The SOC may be a percentage or a ratio relative to another predetermined value associated with the battery pack 116 and may correspond to a level of energy stored in the battery pack 116.

An on-board charger 126 is coupled to the battery pack 116 and is designed to transfer energy to the battery pack 116 to increase the SOC of the battery pack 116.

A pack switch 134 may be located between the on-board charger 126 and the battery pack 116. As will be described in more detail below, the pack switch 134 may control distribution of electrical power from the on-board charger 126 to various components of the battery pack 116.

A second pack switch 136 may be located between the fast charger 130 and the battery pack 116. The second pack switch 136 may control distribution of electrical power from the fast charger 130 to various components of the battery pack 116.

The vehicle 102 further includes a charge port 128 that can be coupled to, and receive power from, the EVSE 106. For example, a cable 129 may be connected between the charge port 128 and the EVSE 106. In some embodiments, the charge port 128 may receive power from the EVSE 106 wirelessly. The on-board charger 126 is electrically coupled to the charge port 128 such that power can be received by the on-board charger 126 from the charge port 128. In some embodiments, the charge port 128, or another charge port, may transfer power from the fast charger 130 to the battery pack 116.

The vehicle 102 may further include an input device 132 and an output device 133. For example, the input device 132 may include a button, a touchscreen, or the like. The output device 133 may include, for example, a touchscreen, another display, a speaker, or the like.

The vehicle 102 may further include a network access device 146. The network access device 146 may include any port or device capable of communicating via a wired or wireless interface. For example, the ECU 108 may control the network access device 146 to communicate with an external device 148, such as a cell phone of a driver, via a Bluetooth® protocol, a Wi-Fi protocol, a cellular protocol, or the like. The network access device 146 may be considered an output device as it may transmit data to the external device 148 which may be received by a user of the external device 148.

Figure 2:
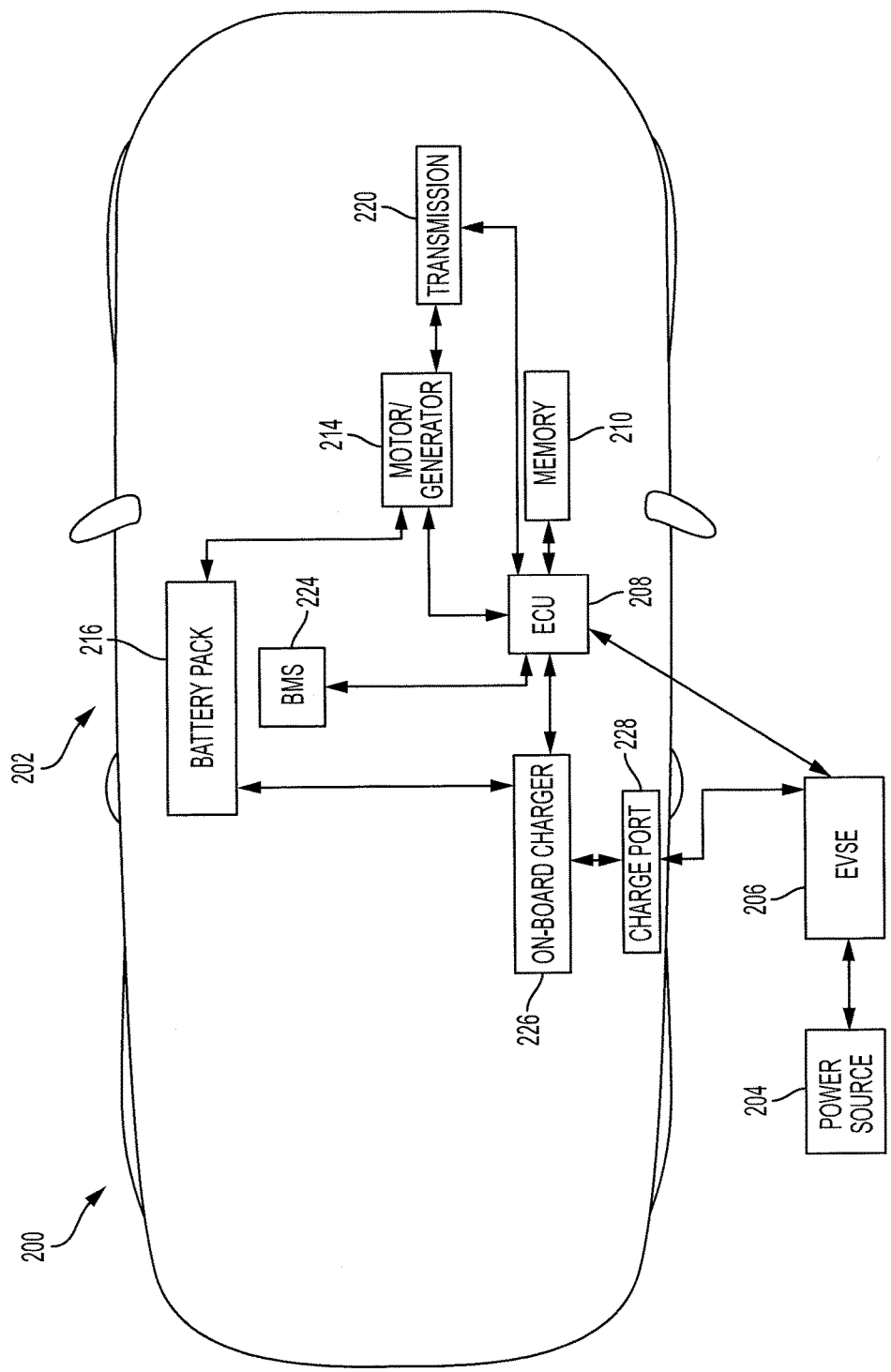
FIG. 2 is a block diagram of an electric vehicle designed to control transfer of electricity from an electric vehicle supply equipment (EVSE) to various battery modules of the electric vehicle according to an embodiment of the present invention.

Turning now to FIG. 2, another vehicle charging system 200 may include components of one or more of a vehicle 202, a power source 204, and an EVSE 206. The vehicle 202 may include similar components as the vehicle 102 of FIG. 1 but may be an electric vehicle instead of a plug-in hybrid vehicle. In that regard, the vehicle 202 may include an ECU 208, a memory 210, a motor-generator 214, a battery pack 216, and a transmission 220. Notably missing from the vehicle 202 are an engine and a power splitter. In that regard, all mechanical power used to move the vehicle 202 may be provided by the motor-generator 214 directly to the transmission 220.

As with the vehicle 102, the vehicle 202 may include a BMS 224, an on-board charger 226, and a charge port 228. The vehicle 202 may further include various switches and other features included in the vehicle 102 of FIG. 1.

Figure 3:
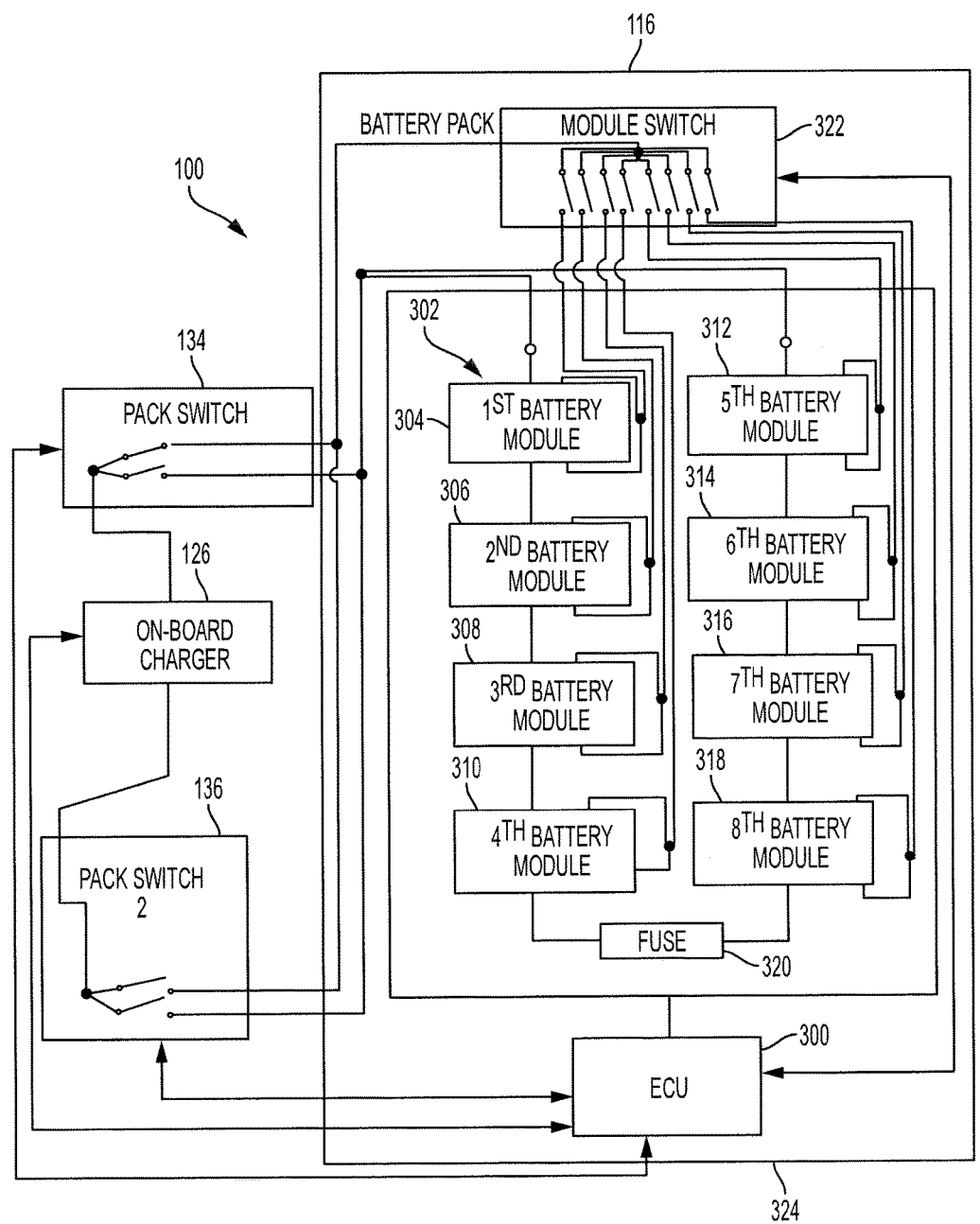
FIG. 3 is a block diagram illustrating various features of a battery pack of the vehicle of FIG. 1 having multiple battery modules according to an embodiment of the present invention.

Turning now to FIG. 3, additional features of the vehicle charging system 100 are shown. As shown in FIG. 3, the battery pack 116 may include a second ECU 300, a plurality of battery modules 302, and a module switch 322. The battery pack 116 may further include a battery pack case 324 in which the ECU 300, the plurality of battery modules 302, and the module switch 322 may be positioned. In some embodiments, one or both of the ECU 300 or the module switch 322 may be positioned external relative to the battery pack case 324.

The plurality of battery modules 302 may include any number of battery modules. As shown in FIG. 3, the plurality of battery modules 302 includes eight battery modules including a first battery module 304, a second battery module 306, a third battery module 308, a fourth battery module 310, a fifth battery module 312, a sixth battery module 314, a seventh battery module 316, and an eighth battery module 318.

The plurality of battery modules 302 may be oriented in any configuration. As shown in FIG. 3, each of the plurality of battery modules 302 may be connected together in series. However, battery modules of a battery pack may be connected together in any combination of series and/or parallel without departing from the scope of the present disclosure.

The battery pack 116 may further include a fuse 320 positioned in series between the fourth battery module 310 and the eighth battery module 318. The fuse 320 may reduce the likelihood of a power surge damaging the one or more of the plurality of battery modules 302 of the battery pack 116. In some embodiments, greater or fewer than one fuse may be included, and the one or more fuse may be positioned at any location relative to the battery modules.

Each of the battery modules 302 may be rated to store power at a rated voltage. The rated voltage may correspond to a maximum desired voltage of each of the battery modules 302. For example, each of the plurality of battery modules 302 may have a rated voltage of 16 volts (V), 32 V, 36 V, 48 V, or the like. As electrical power is used from each of the plurality of battery modules 302, a current voltage of the battery modules 302 may be reduced from the rated voltage.

After a period of time, each of the plurality of battery modules 302 may charge and/or discharge at different rates. Thus, when charging the battery pack 116, the first battery module 304 may reach the rated voltage before the second battery module 306 reaches the rated voltage.

Conventional battery charging systems may stop charging a battery pack when a current voltage of any battery module reaches the rated voltage. However, preventing additional battery charge when fewer than all battery modules are fully charged results in a battery pack having less charge than possible. Stated differently, if charging of the battery pack 116 is stopped when only the first battery module 304 reaches the rated voltage then the other battery modules 302 will not be fully charged.

In some embodiments, the charging system may utilize SOC as a metric instead of voltage. In that regard, SOC may be substituted for voltage where utilized herein.

In order to reduce the likelihood of an incomplete charge of the battery pack 116, the ECU 300 may be adapted to control one or more of the on-board charger 126, the pack switch 134, the second pack switch 136, and the module switch 322 to distribute electrical power in various ways. In particular, the ECU 300 may control one or more of the switches 134, 136, 322 to directly transfer the electrical power from the on-board charger 126 to a combination of all of the plurality of battery modules 302 or to one or more individual battery modules 302.

As shown, the pack switch 134 receives electrical power from the on-board charger 126. The pack switch 134 may be selectively coupled to a combination of all of the plurality of battery modules 302 or to the module switch 322. When the pack switch 134 is coupled to the combination of all of the plurality of battery modules 302, electrical power from the on-board charger 126 is simultaneously routed to all of the battery modules 302. In that regard, each of the plurality of battery modules 302 receives the electrical power.

The second pack switch 136 likewise receives power from the on-board charger 126 and is selectively coupled to the combination of all of the plurality of battery modules 302 or to the module switch 322. When the second pack switch 136 is coupled to the combination of all of the plurality of battery modules 302, electrical power from the on-board charger 126 is simultaneously routed to all of the battery modules 302. In that regard, each of the plurality of battery modules 302 receives the electrical power.

The module switch 322 may receive power from one or both of the pack switch 134 and the second pack switch 136. The module switch 322 may be selectively coupled to each of the plurality of battery modules 302. In that regard, the ECU 300 may control the module switch 322 to provide power from the pack switch 134 or the second pack switch 136 to one or more of the plurality of battery modules 302.

In some embodiments, a vehicle may not include a pack switch. In that regard, a module switch may control power distribution from an on-board charger to a combination of all battery modules or to select battery modules based on input from an ECU.

Figure 4:
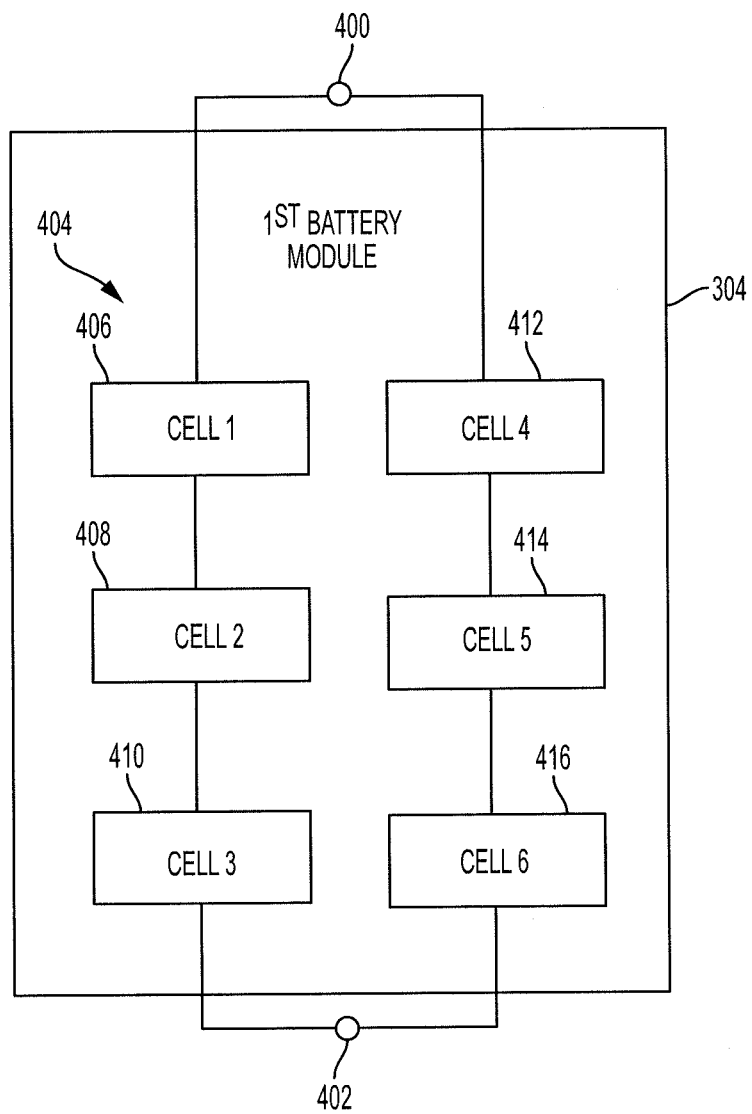
FIG. 4 is a block diagram illustrating various features of one of the multiple battery modules of the battery pack of FIG. 3 according to an embodiment of the present invention.

Each of the plurality of battery modules 302 may include a plurality of battery cells. For example and referring to FIGS. 3 and 4, the first battery module 304 may include a plurality of battery cells 404 including a first battery cell 406, a second battery cell 408, a third battery cell 410, a fourth battery cell 412, a fifth battery cell 414, and a sixth battery cell 416. Each of the plurality of battery cells 404 may be coupled together in any combination of series and/or parallel and may store electrical energy.

The first battery module 304 may further include a first terminal 400 and a second terminal 402. The module switch 322 may provide the electrical power to the first battery module 304 by closing a circuit between the on-board charger 126 and the terminals 400, 402.

Figure 5:
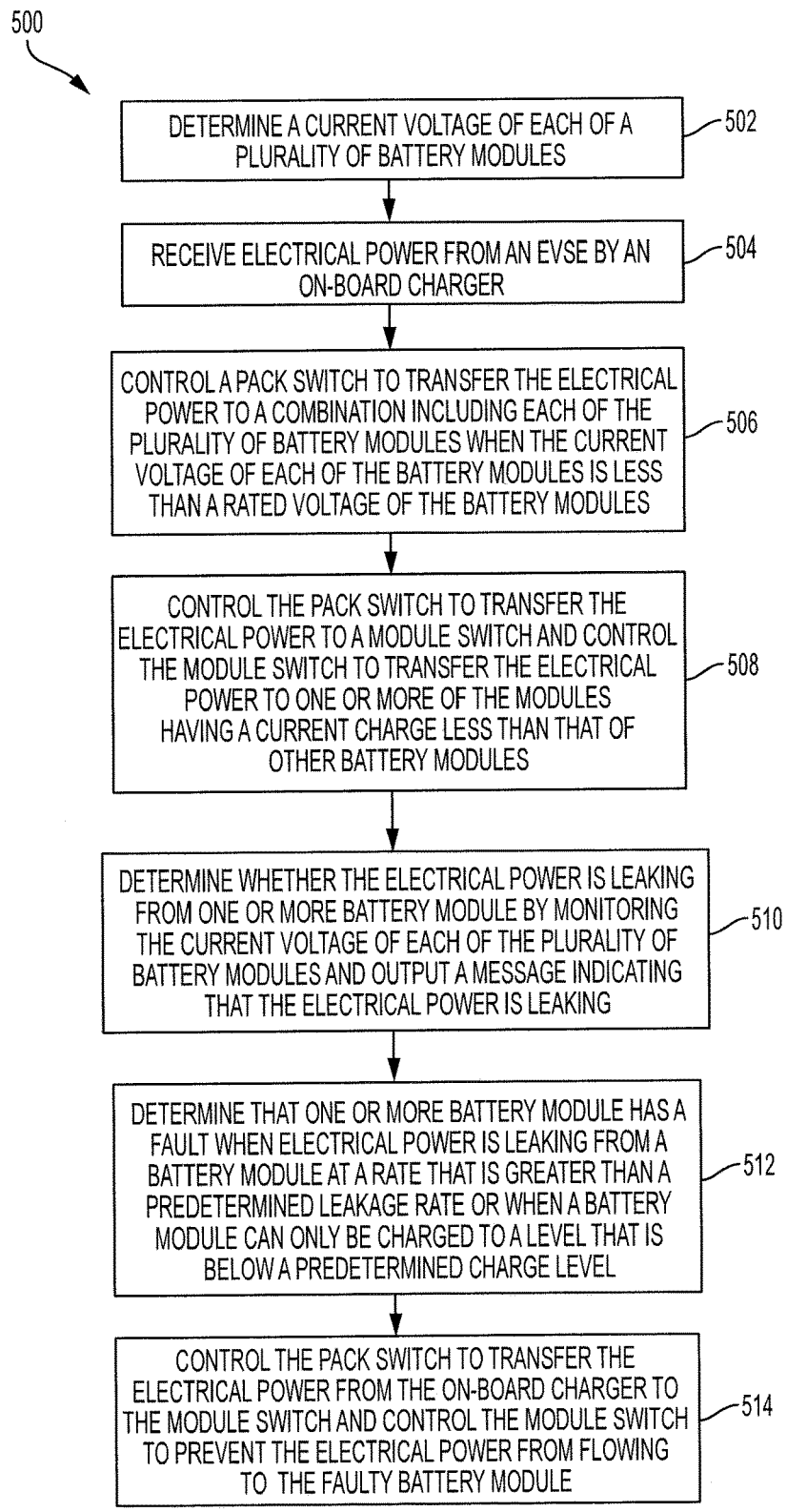
FIG. 5 is a flowchart illustrating a method for controlling transfer of electrical power to select battery modules of the battery pack of FIG. 3 to increase robustness of battery pack charging according to an embodiment of the present invention.

Referring now to FIGS. 1, 3, and 5, a method 500 for controlling charging of the battery pack 116 is shown. The method 500 may also or instead be used for controlling charging of a battery pack of a vehicle other than the vehicle 102 without departing from the scope of the present disclosure.

The different blocks of the method 500 may be performed by various features of the vehicle 102. The control blocks will be discussed as being performed by the ECU 300, however, one skilled in the art will realize that the control blocks may be performed by either or both of the ECU 300 or the ECU 108.

In block 502, the ECU 300 may determine a current voltage of each of the plurality of battery modules. For example, the ECU 300 may receive the current voltage from one or more features of the battery pack 116 and/or from the BMS 124.

In block 504, the on-board charger 126 may receive electrical power from the EVSE 106. For example, the on-board charger 126 may receive the electrical power via the cable 129 and the charge port 128. In some embodiments, the electrical power may be provided directly to the battery pack 116 via the fast charger 130 and the second pack switch 136.

In block 506, upon receiving the electrical power from the power source 104, the ECU 300 may determine whether the current voltage of each of the battery modules 302 is less than the rated voltage of the battery modules 302. If the current voltage of each of the battery modules 302 is less than the rated voltage, the ECU 300 may control the pack switch 134 (or the second pack switch 136) to provide the electrical power to the combination of all of the battery modules 302.

The ECU 300 may continue to control the pack switch 134 to provide the electrical power to the combination of all of the battery modules 302 until the current voltage of one or more of the battery modules 302 reaches or exceeds the rated voltage. In some embodiments, the ECU 300 may control the pack switch 134 to provide the electrical power to the combination of battery modules 302 until the current voltage of one or more of the battery modules 302 reaches a voltage that is within a predetermined amount of the rated voltage. For example, the predetermined amount may be 2 V and the rated voltage may be 35 V. In that regard, the ECU 300 may control the pack switch 134 to provide the electrical power to the combination of battery modules 302 until the current voltage of one of the battery modules 302 reaches 33 V. The predetermined amount may correspond to an amount of voltage that is sufficiently inconsequential such that any given battery module may be considered fully charged when the current voltage of the battery module is within the predetermined amount of the rated voltage. As used herein, a current voltage of a battery module may reach the rated voltage when the current voltage is within the predetermined amount of the rated voltage or when the current voltage becomes equal to or greater than the rated voltage.

In block 508, the ECU 300 may control the pack switch 134 to transfer the electrical power from the on-board charger 126 to the module switch 322 when or after one or more of the battery modules 302 reaches the rated voltage. At the same time, the ECU 300 may control the module switch 322 to transfer the electrical power to one or more of the battery modules 302 that has a current charge that is less than that of other battery modules. In some embodiments, the ECU 300 may control the module switch 322 to transfer the electrical power to one or more of the battery modules 302 that has a current charge that is less than the rated voltage.

In some embodiments, a battery module may not be individually charged unless a current voltage of the battery module is less than the current voltage of another battery module (or less than the rated voltage) by at least a predetermined voltage level. The predetermined voltage level may correspond to an amount of voltage considered sufficiently great to affect the robustness of the vehicle battery charge. In that regard, if a current voltage of the first battery module 304 is within the predetermined voltage level of the second battery module 306 (or the rated voltage) then the first battery module 304 may be considered sufficiently charged. Otherwise, the first battery module 304 may be considered insufficiently charged such that extra charging is desired.

For example, the first battery module 304 may have a current voltage of 30 V (which may also be the rated voltage) and the predetermined voltage level may be 5 V. If the second battery module 306 has a current voltage of 26 V then the ECU 300 may prevent the module switch 322 from transferring the electrical power to the second battery module 306. However, if the second battery module 306 has a current voltage of 24 V then the ECU 300 may control the module switch 322 to transfer the electrical power to the second battery module 306.

In some embodiments, the ECU 300 may control the module switch 322 to transfer the electrical power to the second battery module 306 until the second battery module 306 reaches the current voltage of the first battery module 304 (or the rated voltage). In some embodiments, the ECU 300 may control the module switch 322 to transfer the electrical power to the second battery module 306 until the second battery module reaches a voltage that is within the predetermined voltage level of the current voltage of the first battery module 304.

Figure 6:
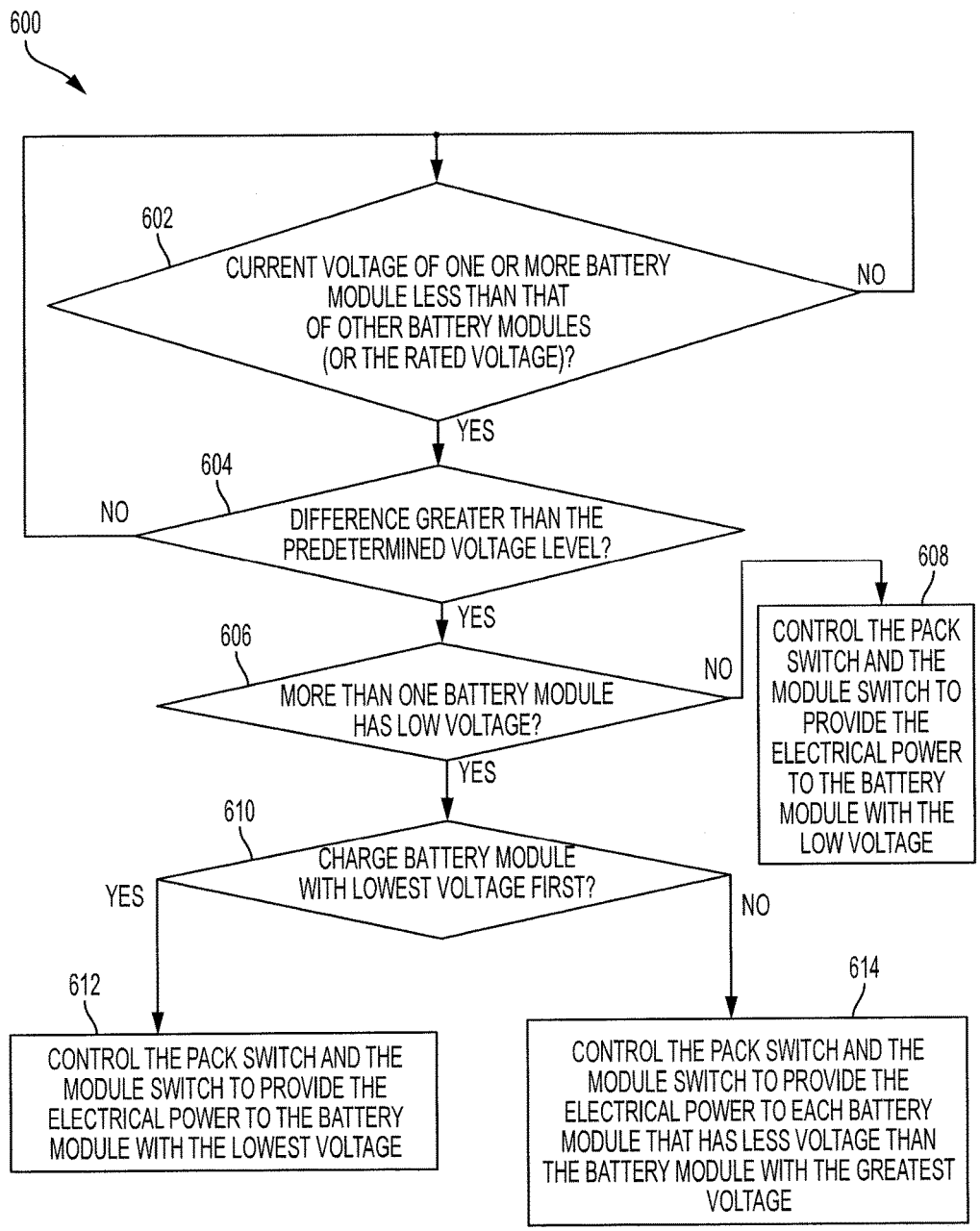
FIG. 6 is a flowchart illustrating a method for controlling transfer of electrical power to one or more of the battery modules of the battery pack of FIG. 3 having a low voltage according to an embodiment of the present invention.

Referring now to FIGS. 1, 3, and 6, a method 600 for controlling the module switch 322 to selectively transfer the electrical power to one or more of the battery modules 302 is shown. In that regard, the method 600 may be used in place of block 508 of FIG. 5. The method 600 may be performed by an ECU such as the ECU 108 or the ECU 300.

In block 602, the ECU 300 may determine whether the current voltage of one or more battery module 302 is less than that of one or more other battery modules 302. In some embodiments, the ECU 300 may also or instead determine whether the current voltage of one or more battery module 302 is less than the rated voltage. If the current voltage of one or more battery module 302 is not less than that of one or more other battery module 302 (or the rated voltage) then the method may remain at block 602. If the current voltage of one or more battery module 302 is less than that of other battery modules 302 (or the rated voltage) then the method 600 may proceed to block 604.

In block 604, the ECU 300 may determine whether the difference between the current voltages of the battery modules 302 (or the difference between current voltage of a battery module 302 and the rated voltage) is greater than the predetermined voltage level. If the difference is less than the predetermined voltage level then the method 600 may return to block 602. If the difference is greater than or equal to the predetermined voltage level then the method 600 may proceed to block 606. In some embodiments, block 604 may not exist such that the method 600 proceeds directly to block 606 after block 602.

In block 606, the ECU 300 may determine whether more than one of the battery modules 302 has a low voltage. A low voltage corresponds to a battery module voltage that is less than the voltage of another battery module (or the rated voltage) by at least the predetermined voltage level. Stated differently, in block 606, the ECU 300 may determine whether more than one of the battery modules 302 has a voltage that is less than one or more other battery module 302 by at least the predetermined voltage level. In some embodiments, in block 606, the ECU 300 may determine whether more than one of the battery modules 302 has a voltage that is less than the rated voltage by at least the predetermined voltage level. If only one battery module has a low voltage then the method may proceed to block 608. If more than one battery module has a low voltage then the method may proceed to block 610.

In block 608, the ECU 300 may control the pack switch 134 and the module switch 322 to transfer the electrical power to the battery module that has the low voltage. Because the single battery module is the only battery module with the low voltage the ECU may control the pack switch 134 and the module switch 322 to prevent electrical power from being transferred to the other battery modules 302.

In block 610, the ECU 300 may determine whether to charge whichever of the battery modules 302 has the lowest voltage first, or to simultaneously charge all of the battery modules 302 that have the low voltage. This determination may be made based on one or more of input received from a user, logic performed by the ECU 300, or pre-programming of the ECU 300 by the vehicle manufacturer.

In some embodiments, the ECU 300 may determine to charge one or more battery module and not to charge another one or more battery module based on additional information. For example, the ECU 300 may determine that the first battery module 304 and the second battery module 306 both have low voltage, and that electrical power leaks from the second battery module 306. Due to the power leakage from the second battery module 306, the ECU 300 may determine to only charge the first battery module 304 and to charge the second battery module 306 after the first battery module 304 has been fully charged. Charging the battery modules 304, 306 in this way optimizes power transfer because the initial power is provided to the non-leaking battery module 304.

If the ECU 300 determines to charge a battery module having the lowest voltage (or to charge one or more battery module without charging another one or more battery module also having a low voltage) then the method 600 may proceed to block 612. Otherwise, the method 600 may proceed to block 614.

In block 612, the ECU 300 may control the pack switch 134 and the module switch 322 to provide the electrical power to the battery module having the lowest voltage (or to another battery module as determined by the ECU 300). In block 614, the ECU 300 may control the pack switch 134 and the module switch 322 to provide the electrical power to each of the battery modules 302 that have the low voltage.

Returning reference now to FIGS. 1, 3, and 5, the method 500 may proceed to block 510 after controlling the pack switch 134 and the module switch 322 to supplement the electrical power of battery modules 302 having low voltage.

In block 510, the ECU 300 may determine whether the electrical power is leaking from one or more battery module 302. The ECU 300 may determine leakage of electrical power based on one or more factors. For example, the ECU 300 may monitor the current voltage of each of the battery modules 302, may monitor the SOC of each of the battery modules 302, or the like. If the current voltage and/or the SOC of the first battery module 304 reduces over a period of time, with no attached power drain, then the ECU 300 may determine that the first battery module 304 has a power leak.

Any action taken by the ECU 300 in response to determining that the first battery module 304 has a power leak may be based on a leakage rate of the power leak. If the first battery module 304 is leaking at a leakage rate that is less than a predetermined leakage rate then the ECU 300 may determine that the first battery module 304 is sufficiently operational but should be checked out by a service technician. In that regard, the predetermined leakage rate may correspond to a leakage rate below which a battery module may still be considered functional.

If the ECU 300 determines that the first battery module 304 has a power leak and that the power leak is less than a predetermined leakage rate, then the ECU 300 may control the output device 133 to output a message indicating that the electrical power is leaking from the battery pack 116. For example, the ECU 300 may control a display to output a message indicating that the electrical power is leaking and that the vehicle 102 should be taken in for service. As another example, the ECU 300 may control the network access device 146 to transmit a message to the user device 148 indicating that the vehicle 102 should be taken in for service.

In block 512, the ECU 300 may determine whether one or more battery module 302 has a fault. The ECU 300 may determine that a fault is present based on one or more of leakage of electrical power or a maximum charge level of a battery module. For example, if the first battery module 304 is leaking electrical power at a rate that is greater than the predetermined leakage rate then the ECU 300 may determine that the first battery module 304 is faulty.

As another example, each of the plurality of battery modules 302 may originally be capable of storing a maximum charge level. The maximum charge level may correspond to a maximum SOC, a maximum voltage (i.e., the rated voltage), or the like. As time goes on, the maximum charge level of each of the plurality of battery modules 302 may become reduced. Over time, the maximum charge level of one or more of the plurality of battery modules 302 may be reduced below a predetermined charge level. In that regard, the predetermined charge level may correspond to a maximum charge level below which a battery module may be considered faulty.

For example, the first battery module 304 may originally have a maximum charge level of 35 V and the predetermined charge level may be 25 V. If the first battery module 304 is eventually unable to be charged beyond 25 V then the ECU 300 may determine that the first battery module 304 is faulty.

In block 514, if the ECU 300 determines that one or more battery module 302 is faulty, the ECU 300 may control the pack switch 134 to transfer the electrical power from the on-board charger 126 to the module switch 322. The ECU 300 may further control the module switch 322 to prevent the electrical power from flowing to the faulty battery module. In that regard, the ECU may prevent or reduce the likelihood of electrical power being transferred to any of the plurality of battery modules 302 that is deemed faulty. The ECU 300 may further control the output device 133 to output a message indicating that one or more of the battery modules 302 is faulty and that the vehicle 102 should be taken to a repair center for service.

In an exemplary use of the method 500 and referring to FIGS. 1, 3, and 5, the vehicle 102 may be parked at a charging location and the charge port 128 may be connected to the EVSE 106. Upon this initial connection, the ECU 108 or the ECU 300 may control the pack switch 134 to transfer the energy from the on-board charger 126 to the combination of each of the plurality of battery modules 302. After a period of time, a current voltage of the first battery module 304 may reach the rated voltage. At that point, either of the ECU 108 or the ECU 300 may determine that a current voltage of the second battery module 306, the third battery module 308, the fourth battery module 310, and the fifth battery module 312 has reached the rated voltage. In that regard, the ECU 108 or the ECU 300 may determine that the first battery module 304 through the fifth battery module 312 do not require additional charging.

The ECU 108 or the ECU 300 may further determine that the sixth battery module 314, the seventh battery module 316, and the eighth battery module 318 are not sufficiently charged. For example, the ECU 300 may determine that the current voltage of these three battery modules is low relative to the rated voltage. In that regard, the ECU 300 may control the pack switch 134 to transfer the electrical power from the on-board charger 126 to the module switch 322. The ECU 300 may then control the module switch 322 to transfer the electrical power to only the sixth battery module 314, the seventh battery module 316, and the eighth battery module 318.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle charging system comprising:
   a battery pack including a first battery module and a second battery module each having a plurality of battery cells, the battery pack configured to store electrical energy at a rated voltage;
   a module switch configured to be selectively coupled to the first battery module and the second battery module;
   a battery management system (BMS) coupled to the battery pack and configured to determine a first current voltage of the first battery module and a second current voltage of the second battery module;
   an on-board charger configured to receive electrical power from an electric vehicle supply equipment (EVSE);
   a pack switch coupled to the on-board charger and the battery pack and configured to selectively transfer the electrical power from the on-board charger to the module switch and to a combination of the first battery module and the second battery module; and
   an electronic control unit (ECU) coupled to the module switch, the BMS, and the pack switch and configured to:
      control the pack switch to transfer the electrical power from the on-board charger to the combination of the first battery module and the second battery module when the first current voltage of the first battery module and the second current voltage of the second battery module are both less than the rated voltage,
      control the pack switch to transfer the electrical power from the on-board charger to the module switch and control the module switch to transfer the electrical power to the first battery module when the first current voltage of the first battery module is less than the second current voltage of the second battery module,
      control the pack switch to transfer the electrical power from the on-board charger to the module switch and control the module switch to transfer the electrical power to the second battery module when the first current voltage of the first battery module is greater than the second current voltage of the second battery module,
      determine that the electrical power is leaking from the first battery module by monitoring the first current voltage of the first battery module and the second current voltage of the second battery module, and
      control the pack switch to transfer the electrical power from the on-board charger to the module switch and control the module switch to transfer the electrical power to the second battery module before the first battery module regardless of the first current voltage of the first battery module and the second current voltage of the second battery module when the electrical power is leaking from the first battery module and when the second current voltage of the second battery module is less than the rated voltage.

2. The vehicle charging system of claim 1 wherein the battery pack further includes a third battery module and the ECU is further configured to:

control the pack switch to transfer the electrical power from the on-board charger to the module switch and control the module switch to transfer the electrical power to the first battery module when the first current voltage of the first battery module is less than the second current voltage of the second battery module and a third current voltage of the third battery module; and control the pack switch to transfer the electrical power from the on-board charger to the module switch and control the module switch to transfer the electrical power to the first battery module and the second battery module when the first current voltage of the first battery module and the second current voltage of the second battery module are both less than the third current voltage of the third battery module.

3. The vehicle charging system of claim 1 wherein the battery pack further includes a third battery module and the ECU is further configured to control the pack switch to transfer the electrical power from the on-board charger to the module switch and control the module switch to transfer the electrical power to only the first battery module when the first current voltage of the first battery module is less than the second current voltage of the second battery module and the second current voltage of the second battery module is less than a third current voltage of the third battery module.

4. The vehicle charging system of claim 1 wherein the ECU is further configured to:
determine that the first battery module has a fault when at least one of the electrical power is leaking from the first battery module at a rate that is greater than a predetermined leakage rate or the first battery module can only be charged to a level that is below a predetermined charge level; and
control the pack switch to transfer the electrical power from the on-board charger to the module switch and control the module switch to prevent the electrical power from flowing to the first battery module in response to determining that the first battery module has the fault.

5. The vehicle charging system of claim 1 wherein the ECU is further configured to:
control the pack switch to transfer the electrical power from the on-board charger to the module switch and control the module switch to transfer the electrical power to the first battery module when the first current voltage of the first battery module is less than the second current voltage of the second battery module by a predetermined voltage level; and
prevent at least one of the pack switch or the module switch from transferring the electrical power from the on-board charger to the first battery module when a difference between the first current voltage of the first battery module and the second current voltage of the second battery module is less than the predetermined voltage level.

6. The vehicle charging system of claim 1 wherein the battery pack further includes a battery pack case and the module switch and the ECU are positioned within the battery pack case.

7. The vehicle charging system of claim 1 wherein the ECU is further configured to control the pack switch to transfer the electrical power from the on-board charger to the combination of the first battery module and the second battery module until at least one of the first current voltage of the first battery module or the second current voltage of the second battery module reaches the rated voltage.

8. The vehicle charging system of claim 1 wherein the ECU is further configured to control the pack switch to transfer the electrical power from the on-board charger to the combination of the first battery module and the second battery module until at least one of the first current voltage of the first battery module or the second current voltage of the second battery module reaches the rated voltage.

9. A method for charging a battery pack for use in a vehicle comprising:
determining, by a battery management system (BMS), a first current voltage of a first battery module and a second current voltage of a second battery module of the battery pack;
receiving, by an on-board charger, electrical power from an electric vehicle supply equipment (EVSE);
controlling, by an electronic control unit (ECU), a pack switch to transfer the electrical power from the on-board charger to a combination of the first battery module and the second battery module when the first current voltage of the first battery module and the second current voltage of the second battery module are both less than a rated voltage;
controlling, by the ECU, the pack switch to transfer the electrical power from the on-board charger to a module switch and controlling, by the ECU, the module switch to transfer the electrical power to the first battery module when the first current voltage of the first battery module is less than the second current voltage of the second battery module;
controlling, by the ECU, the pack switch to transfer the electrical power from the on-board charger to the module switch and controlling, by the ECU, the module switch to transfer the electrical power to the second battery module when the first current voltage of the first battery module is greater than the second current voltage of the second battery module;
determining, by the ECU, that the electrical power is leaking from the first battery module by monitoring the first current voltage of the first battery module and the second current voltage of the second battery module; and
controlling, by the ECU, the pack switch to transfer the electrical power from the on-board charger to the module switch and controlling, by the ECU, the module switch to transfer the electrical power to the second battery module before the first battery module regardless of the first current voltage of the first battery module and the second current voltage of the second battery module when the electrical power is leaking from the first battery module and when the second current voltage of the second battery module is less than the rated voltage.

10. The method of claim 9 further comprising:
controlling, by the ECU, the pack switch to transfer the electrical power from the on-board charger to the module switch and controlling, by the ECU, the module switch to transfer the electrical power to the first battery module when the first current voltage of the first battery module is less than the second current voltage of the second battery module and a third current voltage of a third battery module; and
controlling, by the ECU, the pack switch to transfer the electrical power from the on-board charger to the module switch and controlling, by the ECU, the module switch to transfer the electrical power to the first battery module and the second battery module when the first current voltage of the first battery module and the second current voltage of the second battery module are both less than the third current voltage of the third battery module.

11. The method of claim 9 further comprising controlling, by the ECU, the pack switch to transfer the electrical power from the on-board charger to the module switch and controlling, by the ECU, the module switch to transfer the electrical power to only the first battery module when the first current voltage of the first battery module is less than the second current voltage of the second battery module and the second current voltage of the second battery module is less than a third current voltage of a third battery module.

12. The method of claim 9 further comprising:
determining, by the ECU, that the first battery module has a fault when at least one of the electrical power is leaking from the first battery module at a rate that is greater than a predetermined leakage rate or the first battery module can only be charged to a level that is below a predetermined charge level; and
controlling, by the ECU, the pack switch to transfer the electrical power from the on-board charger to the module switch and controlling, by the ECU, the module switch to prevent the electrical power from flowing to the first battery module in response to determining that the first battery module has the fault.

13. The method of claim 9 further comprising:
controlling, by the ECU, the pack switch to transfer the electrical power from the on-board charger to the module switch and controlling, by the ECU, the module switch to transfer the electrical power to the first battery module when the first current voltage of the first battery module is less than the second current voltage of the second battery module by a predetermined voltage level; and
preventing, by the ECU, at least one of the pack switch or the module switch from transferring the electrical power from the on-board charger to the first battery module when a difference between the first current voltage of the first battery module and the second current voltage of the second battery module is less than the predetermined voltage level.

14. A vehicle charging system comprising:
a battery pack including a first battery module and a second battery module each configured to store electrical energy at a rated voltage;
a module switch configured to be selectively coupled to the first battery module and the second battery module;
a battery management system (BMS) coupled to the battery pack and configured to determine a first current voltage of the first battery module and a second current voltage of the second battery module;
an on-board charger configured to receive electrical power from an electric vehicle supply equipment (EVSE);
a pack switch coupled to the on-board charger and the battery pack and configured to selectively transfer the electrical power from the on-board charger to the module switch and to a combination of the first battery module and the second battery module; and
an electronic control unit (ECU) coupled to the module switch, the BMS, and the pack switch and configured to:
control the pack switch to transfer the electrical power from the on-board charger to the combination of the first battery module and the second battery module or to the module switch,
control the module switch to transfer the electrical power to the first battery module or to the second battery module based on the first current voltage and the second current voltage,
determine that the electrical power is leaking from the first battery module by monitoring the first current voltage of the first battery module and the second current voltage of the second battery module, and
control the module switch to transfer the electrical power to the second battery module before the first battery module regardless of the first current voltage of the first battery module and the second current voltage of the second battery module when the electrical power is leaking from the first battery module and when the second current voltage of the second battery module is less than the rated voltage.

15. The vehicle charging system of claim 14 wherein the ECU is configured to control the pack switch to transfer the electrical power from the on-board charger to the combination of the first battery module and the second battery module when the first current voltage of the first battery module and the second current voltage of the second battery module are both less than the rated voltage.

16. The vehicle charging system of claim 14 wherein the ECU is configured to:
control the pack switch to transfer the electrical power from the on-board charger to the module switch and control the module switch to transfer the electrical power to the first battery module when the first current voltage of the first battery module is less than the second current voltage of the second battery module; and
control the pack switch to transfer the electrical power from the on-board charger to the module switch and control the module switch to transfer the electrical power to the second battery module when the first current voltage of the first battery module is greater than the second current voltage of the second battery module.

17. The vehicle charging system of claim 14 wherein the ECU is further configured to:
determine that the first battery module has a fault when at least one of the electrical power is leaking from the first battery module at a rate that is greater than a predetermined leakage rate or the first battery module can only be charged to a level that is below a predetermined charge level; and
control the pack switch to transfer the electrical power from the on-board charger to the module switch and control the module switch to prevent the electrical power from flowing to the first battery module in response to determining that the first battery module has the fault.

18. The vehicle charging system of claim 14 wherein the ECU is further configured to:
control the pack switch to transfer the electrical power from the on-board charger to the module switch and control the module switch to transfer the electrical power to the first battery module when the first current voltage of the first battery module is less than the second current voltage of the second battery module by a predetermined voltage level; and
prevent at least one of the pack switch or the module switch from transferring the electrical power from the on-board charger to the first battery module when a difference between the first current voltage of the first battery module and the second current voltage of the second battery module is less than the predetermined voltage level.

\* \* \* \* \*